United States Patent Office 3,755,371
Patented Aug. 28, 1973

3,755,371
PROCESS FOR THE PRODUCTION OF LACTONES
Nazar S. Aprahamian, West Nyack, N.Y., assignor to Union Carbide Corporation, New York, N.Y.
No Drawing. Filed July 15, 1970, Ser. No. 55,217
Int. Cl. C07d 7/06, 9/00
U.S. Cl. 260—343
23 Claims

ABSTRACT OF THE DISCLOSURE

A liquid phase co-oxidation process for the production of lactones comprising admixing, in a nitrile medium, a cyclic ketone, an aldehyde, and an oxygen containing gas; maintaining a ratio of preferably about 6 to about 27 mols of ketone per mol of aldehyde throughout the reaction; and maintaining said mixture at a temperature of preferably about 60° C. to about 110° C.

FIELD OF THE INVENTION

This invention relates to a process for the production of lactones and, more particularly, to a non-catalytic liquid phase process for the production of lactones by indirect oxidation of cyclic ketones.

DESCRIPTION OF THE PRIOR ART

Lactones are of considerable importance in the chemical industry as intermediates in the preparation of polymers such as polyurethanes, perfumes and pharmaceuticals and processes for preparing these compounds are well known.

There is a need, however, for a high efficeincy, preferably non-catalytic, process to meet the competitive demands of industry. Such a process desirably should avoid the use of peracetic acid per se and the attendant preparation, separation and storage problems, provide increased reaction rates and productivity and, product-wise, achieve as low an acid to lactone ratio as possible, e.g., approaching 1.5:1.

SUMMARY OF THE INVENTION

An object of this invention, therefore, is to provide a new process for the production of lactones which improves efficiency-wise upon heretofore known processes wherein cyclic ketone, aldehyde and oxygen are initial reactants.

Other objects and advantages will become apparent hereafter.

According to the present invention, a high efficiency one-step liquid phase co-oxidation process for the production of lactones has been discovered which comprises admixing, in an organic liquid medium comprising mono- or dinitriles selected from the group consisting of saturated aliphatic nitriles having up to 10 carbon atoms in the non-nitrilic moiety and saturated cycloaliphatic nitriles having up to 15 carbon atoms in the non-nitrilic moiety and up to 6 carbon atoms in each ring, and mixtures thereof, a cyclic ketone; an aldehyde selected from the group consisting of unsubstituted straight chain and branched chain aldehydes having from two to seven carbon atoms and benzaldehyde; and an oxygen containing gas.

Co-oxidation is defined herein as the indirect oxidation of a ketone via the oxidation of an aldehyde to an acylperoxy compound and/or peracid which oxidizes the ketone and is not to be confused with processes involving direct oxidation of the ketone with molecular oxygen with the attendant disadvantages thereof which can be translated into low lactone efficiencies based on ketone.

DESCRIPTION OF THE PREFERRED EMBODIMENT

The process can be carried out by feeding a mixture of ketone, aldehyde and nitrile into a reaction vessel. The reaction vessel can be glass, glass-lined or made of aluminum or titanium. A glass lined polytetrafluoroethylene coated stainless steel autoclave is found to be advantageous and, even better from a commercial point of view, it is found that unlined type 316 stainless steel (as defined by the American Iron and Steel Institute) can be used effectively. A tubular reactor made of similar materials can also be used together with multi-point injection to maintain a particular ratio of reactants.

Some form of agitation is preferred to avoid a static system and can be accomplished by using a mechanically stirred autoclave, a multi-point injection system, or a loop reactor wherein the reactants are force circulated through the system. Sparging can also be used. In subject process, it is found that increased rates of reaction are obtained by good gas-liquid contact throughout and that this contact is provided by agitation. The homogeneity of the liquid reactants, provided by the agitation, is also advantageous.

Cyclic ketones useful in the process of this invention can be broadly defined as having one ring containing 4 to 10 carbon atoms. It is to be understood that this definition includes both unsubstituted and substituted cyclic ketones. The following structural formula is illustrative of these cyclic ketones:

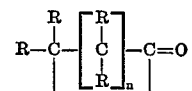

wherein R represents a hydrogen or an alkyl group, straight or branched chain, having 1 to 6 carbon atoms and n is an integer from 2 to 8. Note that the R's can be alike or different.

Since the most important products of this invention from a commercial point of view are the epsilon-caprolactones, the most important and preferred cyclic ketones are the cyclohexanones which include, for example, cyclohexanone, 2-methylcyclohexanone, 3-methylcyclohexanone, 4-methylcyclohexanone, 2-ethylcyclohexanone, 3,3, 5-trimethylcyclohexanone.

These and other cyclohexanones can be used in the process of this invention to produce the following epsilon-caprolactones:

epsicon-caprolactone;
beta-methyl-epsilon-caprolactone;
gamma-methyl-epsilon-caprolactone;
beta-ethyl-epsilon-caprolactone;
gamma-ethyl-epsilon-caprolactone;
beta,gamma-dimethyl-epsilon-caprolactone;
beta,delta-dimethyl-epsilon-caprolactone;
gamma-delta-dimethyl-epsilon-caprolactone;
beta,beta,delta-trimethyl-epsilon-caprolactone;
beta,delta,delta-trimethyl-epsilon-caprolactone;
beta,gamma,delta-trimethyl-epsilon-caprolactone;
beta-ethyl-alpha-methyl-epsilon-caprolactone;

beta-ethyl-gamma-methyl-epsilon-caprolactone;
beta-ethyl-delta-methyl-epsilon-caprolactone;
gamma-ethyl-alpha-methyl-epsilon-caprolactone;
gamma-ethyl-beta-methyl-epsilon-caprolactone;
gamma-ethyl-delta-methyl-epsilon-caprolactone;
beta,beta-dimethyl-epsilon-caprolactone;
gamma,gamma-dimethyl-epsilon-caprolactone;
beta,beta,gamma-trimethyl-epsilon-caprolactone;
beta,beta-dimethyl-gamma-ethyl-epsilon-caprolactone.

Other alkyl substituted epsilon-caprolactones can be produced wherein the alkyl substituent is, for example, propyl, isopropyl, butyl, isobutyl, tertiary butyl, amyl, isoamyl, hexyl, heptyl, octyl, nonyl, decyl, undecyl, and dodecyl groups. Typical representative compounds containing higher alkyl groups are gamma-isopropyl-epsilon-caprolactone, gamma-(2-ethylhexyl)-epsilon-caprolactone.

In the same vein other structurally similar lactones can be produced using unsubstituted and substituted cyclopropanones, cyclobutanones, cyclopentanones, cycloheptanones, cyclooctanones, cyclononanones, or cyclodecanones. The basis for the nomenclature of the lactones will differ depending on the number of carbon atoms in the ring, e.g., gamma-butyrolactone, delta-valerolactone, 2-keto-oxacyclooctane, 2-keto-oxacyclononane, 2-keto-oxacyclodecane, and 2-keto-oxacycloundecane. Examples of substituted lactones falling into this group are alpha-methyl-gamma-butyrolactone, beta - ethyl-delta-valerolactone, 4-methyl-2-keto-oxacyclooctane, 5-ethyl-2-keto-oxacyclononane, 5-methyl - 6 - ethyl-2-keto-oxacyclodecane, and 8-ethyl-2-keto-oxacycloundecane. The latter nomenclature is based on numbering the oxygen atom of the lactone ring as 1 and the carbonyl carbon as 2, etc.

Another useful group of ketones is illustrated by the following structural formula:

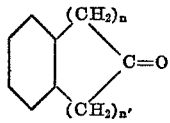

wherein $n$ is 0 or an integer from 1 to 3 and $n'$ is an integer from 1 to 3.

Compounds exemplifying this structural formula are 1-tetralone, 2-tetralone, 1-indanone, and 2-indanone which yield 6,7-benzo-epsilon-caprolactone, 5,6-benzo-epsilon-caprolactone, 5,6-benzo-gamma-valerolactone (or 3,4-dihydrocoumarin), and 4,5 - benzo-gamma-valerolactone, respectively.

The aldehyde is preferably n-butyraldehyde or acetaldehyde but can be any aliphatic aldehyde which contains only carbon, hydrogen, and oxygen. It can be straight chain or branched and can have from two to seven carbon atoms. Examples of aldehydes of this type are propionaldehyde, isobutyraldehyde, n-valeraldehyde, isovaleraldehyde, n-caproaldehyde, n-heptaldehyde and trimethylacetaldehyde. Aromatic aldehydes such as benzaldehyde can also be used. The corresponding carboxylic acids are produced by the process of this invention, e.g., butyric acid, acetic acid, propionic acid, isobutyric acid, pentanoic acid, etc.

A nitrile is present as the organic liquid medium or solvent and is a critical component in that the efficiency is lowered by the substitution of other solvents. As stated heretofore, the solvent is a liquid medium comprising mono- or dinitriles selected from the group consisting of saturated aliphatic nitriles having up to 10 carbon atoms in the non-nitrilic moiety and saturated cycloaliphatic nitriles having up to 15 carbon atoms in the non-nitrilic moiety and up to 6 carbon atoms in each ring, and mixtures thereof. Primary, secondary and tertiary nitriles are contemplated with the primary and tertiary being preferred. The desired nitriles are exemplified by the following structural formulas:

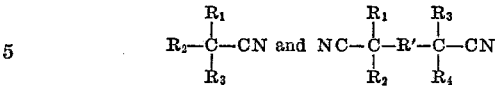

wherein $R_1$, $R_2$, $R_3$, and $R_4$ are alkyl groups; hydrogen atoms; or alkylene portions of an alicyclic ring and $R'$ is a covalent bond or an alkylene group. Examples are as follows: acetonitrile, propionitrile, butyronitrile, isobutyronitrile, valeronitrile, isovaleronitrile, capronitrile, isocapronitrile, heptanonitrile, isoheptanonitrile, caprylonitrile, 3-methylheptanonitrile, pivalonitrile, dimethylacetonitrile, succinonitrile, adiponitrile, glutaronitrile, 2,5-dimethyladiponitrile, 4-methyl-1,7-heptanodinitrile, cyclopentanecarbonitrile, cyclohexanecarbonitrile, 1,2-cyclopentanedicarbonitrile, 1,2 - cyclohexanedicarbonitrile. Preferred nitriles are acetonitrile, propionitrile, butyronitrile and methylcyclohexylnitrile. Other useful nitriles are a mixture of 2,5- and 2,6-dicyanobicyclo[2-2-1]heptane, and 1,2-cyclobutanedicarbonitrile.

The amount of nitrile present can be in the range of about 0.5 to 5 parts by weight of nitrile to each part by weight of ketone and aldehyde taken together. A preferred range is about 1.5 to 2.5 parts by weight of nitrile for each part of ketone and aldehyde combined. Other quantities of nitrile can be used if desired.

It has been found that the advantages of using a nitrile can be attained even though up to 80 percent by weight (based on the above ranges) thereof is replaced by an inert hydrocarbon solvent such as saturated aliphatic, saturated cycloaliphatic and aromatic solvents which can be substituted or unsubstituted and are exemplified by hexane, cyclohexane and benzene, respectively. In order to take advantage of this solvent substitution, however, a minimum amount of nitrile should be present, i.e., at least one cyano (C≡N) group for each aldehyde (CHO) group present in the reaction mixture. Where a mononitrile is present, therefore, the molar ratio of nitrile to aldehyde will be at least 1:1 and where a dinitrile is present the molar ratio of dinitrile to aldehyde will be at least 1.2.

Fundamentally, it has been found that the use of a nitrile medium or solvent as heretofore described will improve the efficiency of any liquid phase co-oxidation process involving a ketone, an aldehyde and an oxygen containing gas as reactants regardless of the ratio of olefin to aldehyde with one proviso: the molar ratio of ketone to aldehyde must be no greater than 40 mols of ketone per mol of aldehyde to insure that the co-oxidation reaction takes place. The preferred mode, however, is to use specific ketone to aldehyde molar ratios in order to obtain the highest possible efficiencies of lactone and acid based on aldehyde. The high efficiency molar ratios can be within the range of about 0.5 to 40 mols of ketone per mol of aldehyde and is preferably about 6 to 27 mols of ketone per mol of aldehyde. The ratios can be kept constant by the use of a continuous process and by analyzing the outlet ratio and adjusting the feed ratio. In a backmixed reactor, the feed is adjusted until the outlet ratio is within the prescribed range. Where two or more reactors are used in series or the reactor is tubular with multi-point injection, the reactions taking place are considered to be a series of batch reactions and are carefully monitored to insure that the molar ratio in any one reaction is not permitted to go below or rise above the prescribed range. In practice this generally means adjusting the aldehyde input.

The mixture is brought, preferably with agitation, to a temperature of about 0° C. to about 200° C. The preferred temperature range is from about 60° C. to about 110° C. and the optimum temperature is considered to be in the neighborhood of 80° C. to 100° C. At temperatures above 100° C., efficiencies decline gradually and above 200° C., efficiencies fall off rapidly. The process can also be conducted at lower temperatures, for example, lower than 0° C., but these temperatures are of no practical value in view of the slow reaction time.

The pressure under which the reaction vessel is maintained is not critical and there is no upper or lower limit except the practical limitation in cost and size of the reactor. Subatmospheric pressures and pressures of atmospheric to about 1000 pounds per square inch absolute (p.s.i.a.) can be used. Pressures between about 200 and 500 pounds per square inch gauge (p.s.i.g.) are generally used in commercial practice, however.

The atmosphere in the reaction vessel prior to the introduction of oxygen can be comprised of nitrogen or other inert gas, if desired.

An oxygen containing gas wherein the balance of the components of the gas are inert to the reaction such as a mixture of nitrogen and oxygen, air, or oxygen itself is then introduced into the reaction vessel. Generally, the oxygen is introduced under partial pressures such as about 50 to 100 p.s.i. The pressure is not critical. Pressure loss due to consumption of oxygen is adjusted to a constant pressure by the addition of more oxygen. The amount of oxygen used can be based on the aldehyde with which it directly reacts. Advantageous molar ratios of $O_2$ to aldehyde are about 1:1 or less and preferably about 1:2 or less with an optimum of about 1:4. A molar ratio of 1:20 or less is unproductive, however, and a molar excess of $O_2$, while operative, is a waste of oxygen, reduces efficiency and is hazardous. In terms of oxygen partial pressures, very low pressures can be used and the better the method of oxygen transfer, the lower the partial pressure. Agitation is the key to good oxygen transfer and can be provided as mentioned above. High partial pressures can also be used, if desired.

This process can be run in a batchwise or continuous operation, the latter being preferred. The order of introduction of the reactants is determined by the operator based on what is most practical under prevalent conditions and is not of a critical nature.

Catalysts and initiators are not necessary to the reaction, but can be present, although it should be pointed out that some metal catalysts such as cobalt naphthenate are deleterious to the reaction.

Recovery, separation and analysis of products and unreacted materials are accomplished by conventional means.

The reaction discussed herein has the advantage of being easy to control and there is minimal formation of carbon dioxide and methanol. It is preferred that the nitrile and some of the by-product carboxylic acid be recycled to reduce the amount of distillation.

The percent efficiency of lactone based on aldehyde consumption is calculated as follows:

$$\frac{\text{No. of mols of lactone}}{\text{No. of mols of aldehyde fed minus No. of mols of aldehyde recovered}} \times 100$$

Other efficiencies are calculated in a similar manner.

The following examples illustrate the invention. Parts are by weight.

Example 1

The continuous co-oxidation of cyclohexanone with butyraldehyde is carried out in all glass oxidation apparatus. The apparatus comprises a reaction vessel equipped with an inlet tube. The outlet tube is connected in series to a "Dry Ice" condenser, Dry Ice trap, drierite tube, ascarite tube and a double-bellows pump for circulation of oxygen gas. The reaction vessel is thermostated in a constant temperature bath and the oxidation system is connected to a vacuum system.

A mixture of 17 parts of cyclohexanone and 1 part of n-butyraldehyde is introduced into the reaction vessel followed by the addition of 63 parts of acetonitrile and 1 part of benzoyl peroxide. The mixture is agitated and thermostated at 70° C. under vacuum and then oxygen gas is circulated through the reaction mixture at 760 millimeters pressure for a specified length of time. The oxygen is maintained at constant pressure throughout the reaction. 0.5 part aliquots of an equimolar mixture of cyclohexanone and n-butyraldehyde (weight ratio of 1.36 part ketone to 1 part aldehyde) are added at 15 minute intervals.

Analysis and results are as follows:

| | | | | | |
|---|---|---|---|---|---|
| Molar ratio of ketone to aldehyde | 25 | 19 | 15 | 13 | 1 |
| Reaction time (hours) | 2 | 3 | 4 | 5 | 6 |
| Oxygen reacted (mol) | .021 | .029 | .036 | | |
| Cyclohexanone reacted (mol) | .011 | .019 | .027 | .034 | .042 |
| Butyraldehyde reacted (mol) | .021 | .030 | 0.039 | .048 | .058 |
| Butyric acid recovered (mol) | .016 | .025 | .034 | .044 | .054 |
| Epsilon-caprolactone recovered (mol) | .010 | .016 | .021 | .026 | .031 |
| Efficiency of caprolactone based on cyclohexanone reacted (percent) | 91 | 84 | 78 | 77 | 74 |
| Efficiency of caprolactone based on butyraldehyde reacted (percent) | 48 | 53 | 54 | 54 | 53 |

Example 2

The process is carried out in a batchwise manner using the same apparatus and conditions set forth in Example 1 except that 9.8 parts of cyclohexanone and 7.2 parts of n-butyraldehyde were used.

Analysis and results are as follows:

| | | |
|---|---|---|
| Reaction time (minutes) | 76 | 145 |
| Oxygen reacted (mol) | | 0.056 |
| Cyclohexanone reacted (mol) | 0.010 | |
| Butyraldehyde reacted (mol) | | 0.091 |
| Butyric acid recovered (mol) | | 0.083 |
| Epsilon-caprolactone recovered (mol) | 0.008 | 0.018 |
| Efficiency to caprolactone based on cyclohexanone reacted (percent) | 80 | |
| Efficiency to caprolactone based on butyraldehyde reacted (percent) | | 20 |

Example 3

The process is carried out as in Example 2 except that 16 parts of cyclohexanone and 2 parts of butyraldehyde were used.

Analysis and results are as folows:

| | |
|---|---|
| Reaction time (minutes) | 235 |
| Cyclohexanone reacted (mol) | .037 |
| Butyraldehyde reacted (mol) | .047 |
| Butyric acid recovered (mol) | .046 |
| Epsilon-caprolactone recovered (mol) | .026 |
| Efficiency to caprolactone based on cyclohexanone reacted (percent) | 70 |
| Efficiency to caprolactone based on butyraldehyde reacted (percent) | 55 |

Example 4

The process is carried out as in Example 1 except that 15 parts of cyclopentanone and 60 parts of acetonitrile are used. Gamma-valerolactone is recovered. The efficiency to gamma-valerolactone based on cyclopentanone reacted is about 80 percent and the efficiency to gamma-valerolactone based on butyraldehyde reacted is about 50 percent.

Example 5

The process is carried out in an AISI type 316 stainless steel autoclave. A mixture of 350 parts acetonitrile, 98 parts cyclohexanone, and 4.4 parts acetaldehyde is fed into the autoclave which is sealed and heated to 100° C. with constant agitation. Oxygen gas (50 p.s.i.) is introduced into the autoclave and is added at its rate of consumption. During the reaction an equimolar mixture of acetaldehyde and cyclohexanone is fed slowly into the reactor at a rate equal to their consumption. After two hours the mixture is cooled and analyzed. The efficiency to epsilon-caprolactone based on cyclohexanone reacted is about 80 percent. The molar ratio of acetic acid to caprolactone recovered is found to be less than 1.5 to 1.

I claim:
1. A liquid phase co-oxidation process for the production of lactones comprising admixing, in an organic liquid medium comprising mono- or dinitriles selected from the group consisting of saturated aliphatic nitriles having up to 10 carbon atoms in the non-nitrilic moiety and saturated cycloaliphatic nitriles having up to 15 carbon atoms in the non-nitrilic moiety and up to 6 carbon atoms in each ring, and mixtures thereof, wherein the non-nitrilic moieties consist of carbon and hydrogen atoms, a cyclic ketone having the following structural formula:

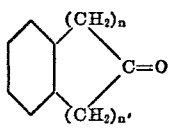

wherein $n$ is 0 or an integer from 1 to 3 and $n'$ is an integer from 1 to 3; an aldehyde selected from the group consisting of unsubstituted straight chain and branched chain aldehydes having from two to seven carbon atoms and benzaldehyde; and an oxygen containing gas wherein the molar ratio of ketone to aldehyde is no greater than 40 to 1.

2. A liquid phase co-oxidation process for the production of lactones having the following structural formula:

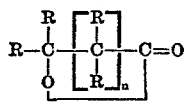

wherein R represents a hydrogen atom or an alkyl group, straight or branched chain, having 1 to 6 carbon atoms and $n$ is an integer from 2 to 8 comprising admixing, in an organic liquid medium comprising mono- or dinitriles selected from the group consisting of saturated aliphatic nitriles having up to 10 carbon atoms in the non-nitrilic moiety and saturated cycloaliphatic nitriles having up to 15 carbon atoms in the non-nitrilic moiety and up to 6 carbon atoms in each ring, and mixtures thereof, wherein the non-nitrilic moieties consist of carbon and hydrogen atoms, a cyclic ketone having the following structural formula:

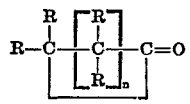

wherein R and $n$ are as hereinabove stated; an aldehyde selected from the group consisting of unsubstituted straight chain or branched chain aldehydes having from two to seven carbon atoms and benzaldehyde; and an oxygen containing gas wherein the molar ratio of ketone to aldehyde is no greater than 40 to 1.

3. The process of claim 1 wherein the cyclic ketone has the following structural formula:

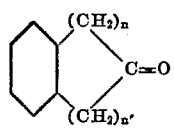

wherein $n$ is 0 or an integer from 1 to 3 and $n'$ is an integer from 1 to 3.

4. The process of claim 2 wherein the temperature is maintained in the range of about 0° to about 200° C. and the molar ratio of ketone to aldehyde is about 0.5 to 40 mols of ketone per mol of aldehyde.

5. The process of claim 4 wherein the temperature is about 60° C. to about 110° C. and the molar ratio of ketone to aldehyde is about 6 to 27 mols of ketone per mol of aldehyde.

6. The process of claim 1 wherein the temperature is about 60° C. to about 110° C. and the molar ratio of ketone to aldehyde is about 6 to 27 mols of ketone per mol of aldehyde.

7. The process of claim 5 wherein the ketone is cyclohexanone and the lactone is epsilon-caprolacetone.

8. The process of claim 5 wherein the aldehyde is selected from the group consisting of acetaldehyde, propionaldehyde, n-butyraldehyde, isobutyraldehyde, n-valeraldehyde, isovaleraldehyde, n-caproaldehyde, n-heptaldehyde and trimethylacetaldehyde.

9. The process of claim 8 wherein the ketone is selected from the group consisting of cyclopentanone, cyclohexanone, and cyclooctanone.

10. The process of claim 7 wherein the aldehyde is n-butyraldehyde.

11. The proceess of claim 4 wherein the nitrile is selected from the group consisting of primary and tertiary nitriles.

12. The process of claim 5 wherein the nitrile has the following structural formula:

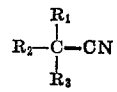

wherein $R_1$, $R_2$ and $R_3$, are alkyl groups; hydrogen atoms; or alkylene portions of an alicyclic ring.

13. The process of claim 5 wherein the nitrile has the following structural formula:

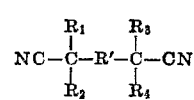

wherein $R_1$, $R_2$, $R_3$, and $R_4$ are alkyl groups; hydrogen atoms; or alkylene portions of an alicyclic ring and $R'$ is a co-valent bond or an alkylene group.

14. The process of claim 9 wherein the nitrile is selected from the group consisting of acetonitrile, propionitrile, butyronitrile and methylcyclohexylnitrile.

15. The process of claim 10 wherein the nitrile is acetonitrile.

16. The process of claim 5 wherein the nitrile is present in an amount of about 0.5 to 5 parts by weight of nitrile to each part by weight of ketone and aldehyde combined.

17. The process of claim 15 wherein the nitrile is present in an amount of about 1.5 to 2.5 parts by weight of nitrile to each part by weight of ketone and aldehyde combined.

18. The process of claim 16 wherein up to 80 percent by weight of the nitrile is replaced by an inert hydrocarbon solvent and wherein there is at least one cyano group for each aldehyde group present in the reaction mixture.

19. The process of claim 14 wherein the process is conducted in a continuous manner.

20. The process of claim 19 wherein the process is conducted with agitation.

21. The process of claim 15 wherein the process is conducted with agitation.

22. The process of claim 15 wherein the process is conducted in a continuous manner.

23. The process of claim 22 wherein the process is conducted with agitation.

References Cited

UNITED STATES PATENTS

| | | | |
|---|---|---|---|
| 3,025,306 | 3/1962 | Guest et al. | 260—343 |
| 3,541,113 | 11/1970 | Von den Hoff | 260—343 |
| 3,564,018 | 2/1971 | Dockner et al. | 260—343 |

OTHER REFERENCES

Derwent Belgian Patents Report No. 34/685: General Organic, p. 2, abstract of Belgian Pat. No. 711,052, Feb. 2, 1968.

JOHN M. FORD, Primary Examiner

U.S. Cl. X.R.

260—343.2 R, 343.3, 343.5, 343.6

PO-1050
(5/69)

UNITED STATES PATENT OFFICE
CERTIFICATE OF CORRECTION

Patent No. 3,755,371  Dated August 28, 1973

Inventor(s) Nazar S. Aprahamian

It is certified that error appears in the above-identified patent and that said Letters Patent are hereby corrected as shown below:

Claim 2 (column 7, line 58), change the colon to a semicolon.

Cancel claim 3.

Claim 7, change "epsilon-caprolacetone" to --epsilon-caprolactone--.

Signed and sealed this 23rd day of April 1974.

(SEAL)
Attest:

EDWARD M.FLETCHER,JR.
Attesting Officer

C. MARSHALL DANN
Commissioner of Patents